United States Patent
Nakagawa (10) Patent No.: US 11,796,345 B2
(45) Date of Patent: Oct. 24, 2023

(54) METHOD AND SYSTEM FOR OPTIMIZED NOTIFICATION OF DETECTED EVENT ON VEHICLES

(71) Applicant: Toyota Motor Engineering & Manufacturing North America, Inc., Plano, TX (US)

(72) Inventor: Masashi Nakagawa, Sunnyvale, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 277 days.

(21) Appl. No.: 17/401,665

(22) Filed: Aug. 13, 2021

(65) Prior Publication Data
US 2023/0047242 A1    Feb. 16, 2023

(51) Int. Cl.
*G01C 21/00* (2006.01)
*B60W 40/08* (2012.01)
*H04W 4/46* (2018.01)

(52) U.S. Cl.
CPC ......... *G01C 21/3885* (2020.08); *B60W 40/08* (2013.01); *G01C 21/3844* (2020.08); *G01C 21/3859* (2020.08); *H04W 4/46* (2018.02); *B60W 2554/4041* (2020.02); *B60W 2554/4049* (2020.02)

(58) Field of Classification Search
CPC ............ G01C 21/3885; G01C 21/3859; G01C 21/3844; H04W 4/46; B60W 40/08; B60W 2554/4041; B60W 2554/4049
USPC ....................................................... 701/420
See application file for complete search history.

(56) References Cited

U.S. PATENT DOCUMENTS

| | | | | |
|---|---|---|---|---|
| 11,435,193 B2* | 9/2022 | Xie | ............. | G01C 21/32 |
| 2012/0323992 A1* | 12/2012 | Brobst | ............. | G01C 21/3694 |
| | | | | 709/203 |
| 2019/0143967 A1* | 5/2019 | Kutila | ............. | B60W 50/14 |
| | | | | 701/23 |

(Continued)

FOREIGN PATENT DOCUMENTS

| | | |
|---|---|---|
| CN | 110799804 A | 2/2020 |
| CN | 111301390 A | 6/2020 |

(Continued)

OTHER PUBLICATIONS

Zhang et al., "Dynamic Map for Obstacle Avoidance," 2003, Publisher: IEEE.*

(Continued)

*Primary Examiner* — Tuan C To
(74) *Attorney, Agent, or Firm* — DINSMORE & SHOHL LLP (57) ABSTRACT

A method comprises receiving, at a vehicle system of a vehicle, sensor data from one or more sensors; detecting an object based on the sensor data; determining whether a dynamic map maintained by a remote computing device includes the detected object; upon determination that the dynamic map includes the detected object, determining a remaining time-to-live associated with the detected object based on data associated with the dynamic map; and transmitting data about the detected object to the remote computing device if the determined remaining time-to-live associated with the detected object is less than a predetermined threshold time.

20 Claims, 6 Drawing Sheets

(56) References Cited

U.S. PATENT DOCUMENTS

| | | | |
|---|---|---|---|
| 2020/0072619 A1* | 3/2020 | Fukui | G01C 21/3878 |
| 2020/0365029 A1 | 11/2020 | Kourousharrigan et al. | |
| 2021/0027628 A1* | 1/2021 | Pfadler | G08G 1/096791 |
| 2021/0266244 A1* | 8/2021 | Haga | H04L 43/0894 |
| 2022/0063652 A1* | 3/2022 | Taylor | B60W 30/17 |
| 2022/0221299 A1* | 7/2022 | Chikamori | G01C 21/3804 |
| 2022/0410904 A1* | 12/2022 | Doba | H04W 4/44 |

FOREIGN PATENT DOCUMENTS

| | | | | |
|---|---|---|---|---|
| CN | 112799424 A | 5/2021 | | |
| KR | 20190140355 A | 12/2019 | | |
| WO | WO-2014070446 A2 * | 5/2014 | | G06F 16/176 |
| WO | 2018105136 A1 | 6/2018 | | |

OTHER PUBLICATIONS

Christian et al., "Active High Dynamic Range Mapping for Dense Visual SLAM," 2017, Publisher: IEEE.*

* cited by examiner

METHOD AND SYSTEM FOR OPTIMIZED NOTIFICATION OF DETECTED EVENT ON VEHICLES

TECHNICAL FIELD

The present specification relates to a traffic management system and more particularly to a method and system for optimized notification of detected event on vehicles.

BACKGROUND

Connected vehicles with on-board sensors may gather sensor data as they drive along one or more roads. The connected vehicles may use the gathered sensor data to detect objects located along or near the roads. As multiple connected vehicles detect along one or more roads, the connected vehicles may transmit this data to a map server, which may aggregate the data to maintain a dynamic map of road objects. As vehicles continue to gather additional sensor data and detect additional objects, the data about the additional detected objects may be continually transmitted to the map server. As such, the map server may continually update the dynamic map to keep it accurate and up to date.

However, as multiple connected vehicles drive along the same roads, different vehicles are likely to detect the same objects as other vehicles. If every vehicle that detects an object transmits the object data to the map server, the map server may receive a significant amount of unnecessary, redundant data about objects that have already been detected by other vehicles. This may waste communication bandwidth that could otherwise be used for other purposes. Accordingly, a need exists for an improved method and system for optimized notification of detected event on vehicles.

SUMMARY

In an embodiment, a method may include receiving, at a vehicle system of a vehicle, sensor data from one or more sensors, detecting an object based on the sensor data, determining whether a dynamic map maintained by a remote computing device includes the detected object, upon determination that the dynamic map includes the detected object, determining a remaining time-to-live associated with the detected object based on data associated with the dynamic map, and transmitting data about the detected object to the remote computing device if the determined remaining time-to-live associated with the detected object is less than a predetermined threshold time.

In another embodiment, a vehicle system for a vehicle may include one or more sensors configured to gather sensor data and a processor. The processor may receive the sensor data from the one or more sensors. The processor may detect an object based on the sensor data. The processor may determine whether a dynamic map maintained by a remote computing device includes the detected object. Upon determination that the dynamic map includes the detected object, the processor may determine a remaining time-to-live associated with the detected object based on data associated with the dynamic map. The processor may transmit data about the detected object to the remote computing device if the determined remaining time-to-live associated with the detected object is less than a predetermined threshold time.

In another embodiment, a system may include a vehicle system of a vehicle and a remote computing device. The remote computing device may maintain a dynamic map of road objects. The vehicle system may receive data associated with the dynamic map from the remote computing device. The vehicle system may collect sensor data from one or more vehicle sensors. The vehicle system may detect an object based on the sensor data. The vehicle system may determine whether the dynamic map includes the detected object. Upon determination that the dynamic map includes the detected object, the vehicle system may determine a remaining time-to-live associated with the detected object based on the data associated with the dynamic map. The vehicle system may transmit data about the detected object to the remote computing device if the determined remaining time-to-live associated with the detected object is less than a predetermined threshold time.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include a method and system for optimized notification of detected event on vehicles. In embodiments disclosed herein, a map server may maintain a dynamic map of objects on or near one or more roads in a particular geographic area. The map server may receive data from one or more connected vehicles within the geographic area indicating objects detected by the vehicles. The map server may continually update the dynamic map based on the data received from connected vehicles.

When the map server receives data from a connected vehicle indicating a detected object that is not currently on the dynamic map, the map server may update the dynamic map to add the detected object. However, when the map server receives data from a connected vehicle indicating a detected object that is already on the dynamic map, it may not be necessary to add the detected object to the dynamic map since the object is already included in the dynamic map. As such, if multiple vehicles repeatedly transmit data indicating the same detected object, the map server may consume unnecessary bandwidth receiving this data.

However, in order to accurately maintain the dynamic map, it may be desirable for the map server to remove objects after a certain period of time, since objects detected by a vehicle at one time may not remain in the same location at a later time. Accordingly, in embodiments disclosed herein, when the map server adds an object to the dynamic map, the map server may also associate a time-to-live (TTL) with the object. The TTL may indicate how long the object is expected to remain at the same location. The TTL for an object may depend on the type of object. Objects that are expected to remain at the same location for a long period of time may have a longer TTL than objects that are expected to move frequently. For example, a traffic sign may have a TTL of several hours, an obstacle may have a TTL of several minutes, and a pedestrian may have a TTL of only a few seconds.

When the map server adds an object to the map, the map server may add data including the location of the object, the category of the object, the TTL of the object, and a timestamp indicating a time at which the object was added to the dynamic map. Then, when the TTL for the object expires, it may be removed from the dynamic map.

However, it may not be desirable to remove the object from the dynamic map if the object still remains at the same location when its TTL expires. Accordingly, in embodiments disclosed herein, the TTL associated with the object may be reset if another vehicle transmits data to the server indicating that the object is still at the same location. However, as discussed above, it may not be desirable for the map server to receive object data every time a connected vehicle detects the same object, as this may consume unnecessary bandwidth.

Accordingly, in embodiments disclosed herein, when a connected vehicle enters a geographic area covered by the map server, the map server may transmit the dynamic map to the connected vehicle. As discussed above, the dynamic may include data indicating locations and categories of detected objects as well as a time that each object was added to the dynamic map and a TTL associated with each object. Then, when the connected vehicle detects an object, it may check the dynamic map to see if the detected object is already included in the dynamic map. If the detected object is not included in the dynamic map, the connected vehicle may transmit data about the detected object to the map server and the map server may update the dynamic map accordingly.

If the object detected by the connected vehicle is included in the dynamic map, the connected vehicle may determine whether the TTL for the detected object is close to expiration on the dynamic map (e.g., whether the remaining TTL is less than 10% of the original TTL). If the TTL for the detected object is close to expiration on the dynamic map, then the connected vehicle may transmit data about the detected object to the map server and the map server may reset the TTL for the object. However, if the TTL for the detected object is not close to expiration on the dynamic map, then the connected vehicle may not transmit data about the detected object to the map server.

Accordingly, when objects on the dynamic map have a TTL that is close to expiration, a connected vehicle that detects the object may transmit the data about the detected object to the map server, thereby indicating to the map server that the object is still present at the same location. This may prevent the map server from removing objects from the dynamic map that should not be removed. However, if the TTL is not close to expiration, connected vehicles may not transmit redundant data about the detected object to the map server, thereby conserving communication bandwidth.

Figure 1:
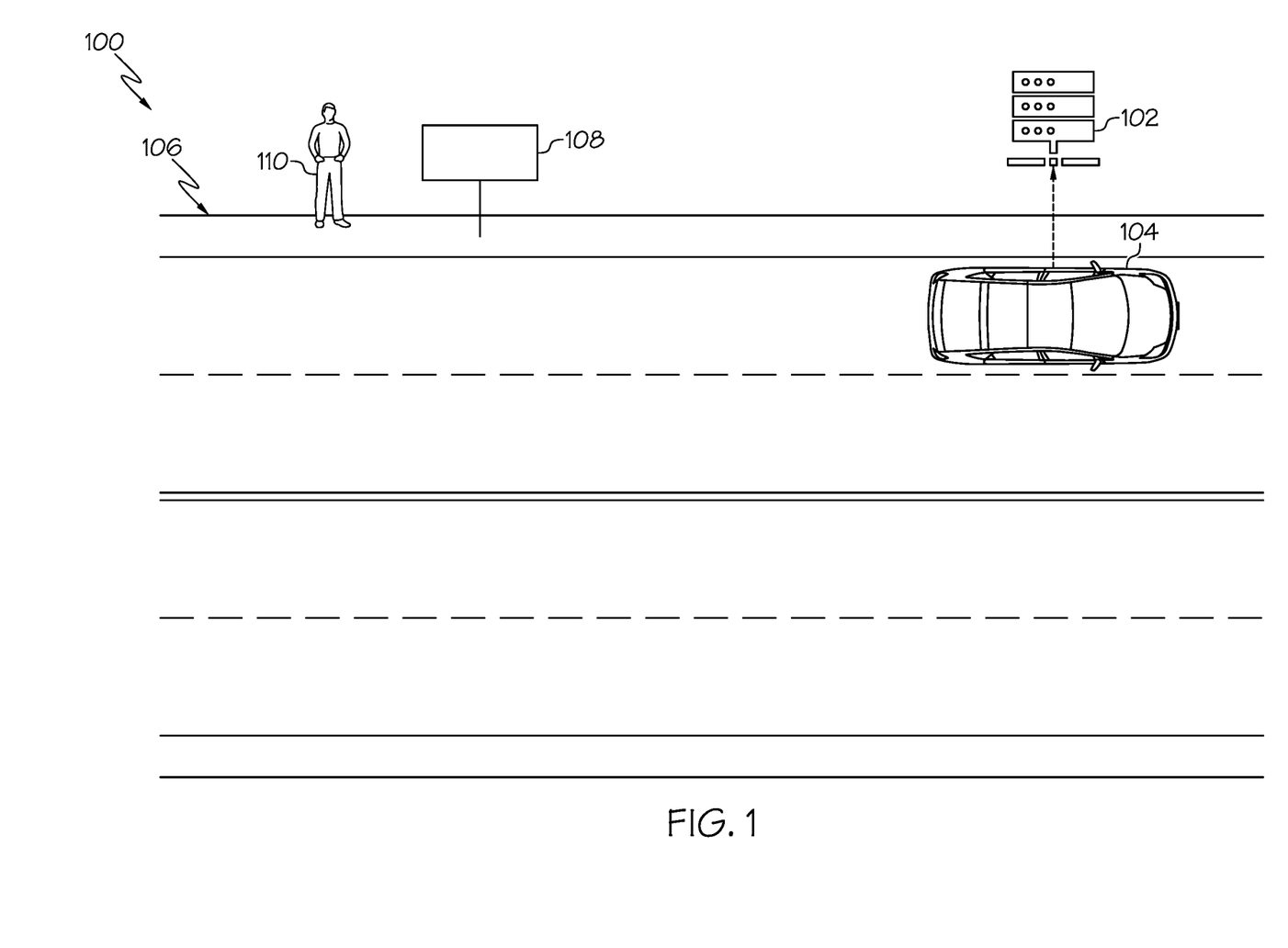
FIG. 1 schematically depicts a system comprising a map server, according to one or more embodiments shown and described herein.

Turning now to the figures, FIG. 1 schematically depicts a system for optimized notification of detected event on vehicles. A system 100 includes a map server 102. The map server 102 may receive data indicating objects detected by connected vehicles and may maintain a dynamic map of distributed objects based on the data received from connected vehicles, as disclosed herein. In the example of FIG. 1, a vehicle 104 drives along a road 106. In the example of FIG. 1, a road sign 108 is positioned along the side of the road 106 and a pedestrian 110 is standing at the side of the road 106.

In the example of FIG. 1, the vehicle 104 may be a fully autonomous vehicle, a semi-autonomous vehicle, or a human-driven vehicle. In the example of FIG. 1, the vehicle 104 is a connected vehicle. A connected vehicle is able to communicate remotely with systems outside of the vehicle (e.g., with the map server 102 and/or other vehicles).

The map server 102 may be communicatively coupled to the vehicle 104. While the example of FIG. 1 illustrates a single vehicle 104 being communicatively coupled to the map server 102, in other examples, any number of connected vehicles may be communicatively coupled to the map server 102. As different connected vehicles enter the geographic area covered by the map server 102 (e.g., a coverage area of the map server 102), the vehicles may connect to the map server 102 as they enter the coverage area and may disconnect from the map server 102 as they leave the coverage area.

In the illustrated example, the map server 102 comprises a cloud computing device. In some examples, the map server may comprise a road-side unit (RSU) positioned near the road 106. In these examples, the system 100 may include any number of RSUs spaced along the road 106 such that each RSU covers a different service area. That is, as the vehicle 104 or other vehicles drive along the road 106, the vehicles may be in range of different RSUs at different times such that different RSUs provide coverage at different locations. Thus, as the vehicle 104 drives along the road 106, the vehicle 104 may move between coverage areas of different RSUs.

In other examples, the map server 102 may be another type of server or remote computing device and may be positioned remotely from the road 106. In some examples, the map server 102 may be an edge server. In some examples, the map server 102 may be a moving edge server, such as another vehicle. In some examples, the map server 102 may be a cloud-based server.

When the vehicle 104 enters the coverage area of the map server 102, the map server may transmit a dynamic map maintained by the map server 102 to the vehicle 104. The dynamic map may indicate locations of objects detected by connected vehicles. As the vehicle 104 drives along the road 106, the vehicle 104 may gather sensor data and may detect objects (e.g., the sign 108 or the pedestrian 110) based on the sensor data. When the vehicle 104 detects an object, the vehicle 104 may transmit data about the detected object to the map server 102 depending on the data contained in the dynamic map, as disclosed in further detail below. When the map server 102 receives data about an object detected by the vehicle 104 or detected by another connected vehicle, the map server 102 may update the dynamic map accordingly. Details of the map server 102 and the vehicle 104 are discussed in further detail below.

Figure 2:
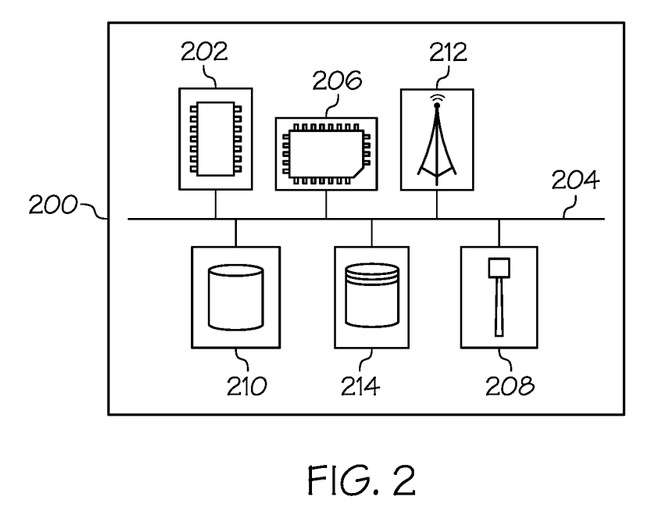
FIG. 2 depicts a schematic diagram of a vehicle system, according to one or more embodiments shown and described herein.

FIG. 2 depicts a vehicle system 200 that may be included in the vehicle 104 of FIG. 1. The vehicle system 200 may represent a vehicle system included in an autonomous vehicle, a semi-autonomous vehicle, or a human-driven vehicle. However, certain components of the vehicle system 200 of FIG. 2 may not be included in certain vehicle types in some examples, as disclosed herein.

In the example of FIG. 2, the vehicle system 200 includes one or more processors 202, a communication path 204, one or more memory modules 206, a satellite antenna 208, one or more vehicle sensors 210, a network interface hardware 212, and a data storage component 214, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as Wi-Fi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory modules 206 are discussed in further detail with respect to FIG. 3.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors), proximity sensors, location sensors (e.g., GPS modules), and the like. In embodiments, the vehicle sensors 210 may monitor the surroundings of the vehicle and may detect other road objects such as other vehicles, pedestrians, obstacles, traffic signs, and the like. The data captured by the vehicle sensors 210 may be processed by the processors 202 to determine locations and categories of detected objects, as disclosed in further detail below.

For autonomous vehicles, the vehicle system 200 may include an autonomous driving module and the data gathered by the vehicle sensors 210 may be used by the autonomous driving module to autonomously navigate the vehicle.

Still referring to FIG. 2, the vehicle system 200 comprises network interface hardware 212 for communicatively coupling the vehicle system 200 to the map server 102. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the vehicle system 200 may transmit data about objects detected by the vehicle system 200, as disclosed in further detail below.

Still referring to FIG. 2, the vehicle system 200 comprises a data storage component 214. The data storage component 214 may store data used by various components of the vehicle system 200. In addition, the data storage component 214 may store data gathered by the vehicle sensors 210 and data associated with a dynamic map received from the map server 102. The data storage component 214 may also store time-to-live data for various categories of objects, as disclosed in further detail below.

In some embodiments, the vehicle system 200 may be communicatively coupled to the map server 102 by a network. In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
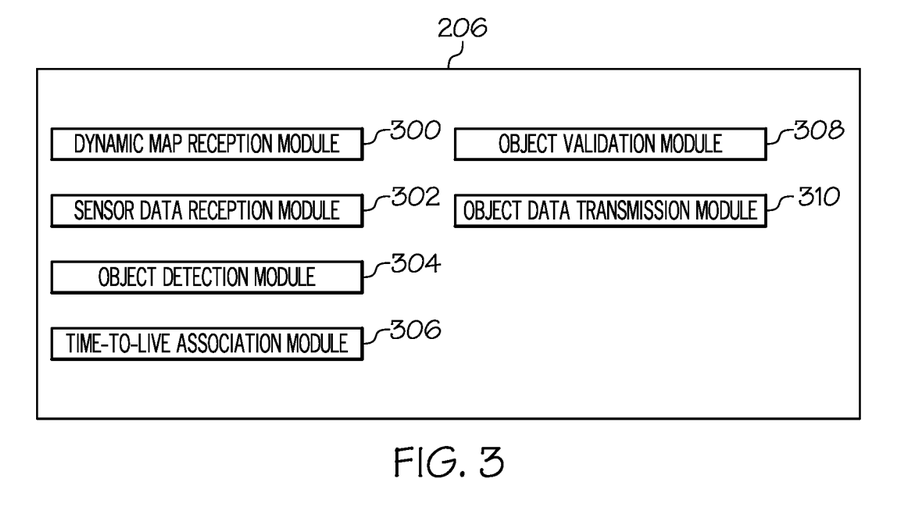
FIG. 3 depicts a schematic diagram of the memory modules of the vehicle system of FIG. 2, according to one or more embodiments shown and described herein.

Now referring to FIG. 3, the one or more memory modules 206 of the vehicle system 200 include a dynamic map reception module 300, a sensor data reception module 302, an object detection module 304, a time-to-live association module 306, an object validation module 308, and an object data transmission module 310.

The dynamic map reception module 300 may cause the network interface hardware 212 to receive data associated with the dynamic map from the map server 102. The dynamic map may include data associated with one or more objects located within the geographic area covered by the map server 102. In embodiments, the data associated with the one or more objects may include a location of each object, a category of each object, a TTL associated with each object, and a timestamp indicating a time that each object was added to the map server 102. After the dynamic map reception module 300 receives dynamic map data, the dynamic map reception module 300 may store the data in the data storage component 214.

In some examples, the TTL associated with an object may indicate the TTL that was initially assigned to the object when the object was added to the dynamic map. Accordingly, the vehicle system 200 may calculate the remaining TTL (e.g., the time remaining before the TTL for the object expires) based on the initial TTL and the timestamp indicating the time at which the object was added to the dynamic map. In other examples, the data associated with the dynamic map received by the dynamic map reception module 300 may include a remaining TTL associated with the object. In some examples, the dynamic map reception module 300 may receive other data associated with objects included in the dynamic map (e.g., object size, positions of bounding boxes for the objects, and the like).

In some examples, the dynamic map reception module 300 may automatically receive dynamic map data from the map server 102 when the vehicle system 200 enters the geographic area covered by the map server 102. In other examples, the dynamic map reception module 300 may cause the network interface hardware 212 to transmit a request to the map server 102 for the dynamic map data. This request may cause the map server 102 to transmit the dynamic map data to the vehicle system 200.

The vehicle system 200 may detect objects, which may be compared to objects on the dynamic map maintained by the map server 102, as disclosed herein. The vehicle system 200 may transmit data about a detected object to the map server 102 based on whether the detected object is already included in the dynamic map and based on a TTL of the object on the dynamic map. The map server 102 may then update the dynamic map server accordingly.

However, if the dynamic map includes certain categories of objects that cannot be detected by the vehicle system 200 (e.g., due to limited capabilities of the vehicle sensors 210), then the vehicle system 200 may not be able to assist the map server 102 in updating the dynamic map with respect to those categories of objects. Accordingly, in some examples, the dynamic map reception module 300 may transmit a list of the categories of objects that the vehicle system is able to detect (e.g., based on the capability of the vehicle sensors 210). The map server 102 may then transmit dynamic map data that only includes data about objects that the vehicle system 200 can detect, and therefore, can assist the map server 102 in keeping track of. The map server 102 may not transmit data about objects that the vehicle system 200 cannot detect. Accordingly, this may reduce the amount of bandwidth needed to transmit the dynamic map data from the map server 102 to the vehicle system 200.

However, in other examples, the map server 102 may transmit dynamic map data about all of the objects on the dynamic map, even if the vehicle system 200 cannot detect all of the objects. In these examples, the vehicle system 200 may not be able to assist the map server 102 in keeping track of all of the objects on the dynamic map. However, the driver of the vehicle, or the autonomous driving system for autonomous vehicles, may still be able to use the dynamic map data to make driving decisions.

The sensor data reception module 302 may receive sensor data captured by the one or more vehicle sensors 210. The received sensor data may be used by the object detection module 304 to detect objects, as explained in further detail below. In embodiments, the sensor data reception module 302 may continually receive sensor data as it is captured by the vehicle sensors 210. As the sensor data reception module 302 receives sensor data, it may be stored in the data storage component 214.

The object detection module 304 may detect objects based on the sensor data received by the sensor data reception module 302. For instance, in the example of FIG. 1, the object detection module 304 may detect the sign 108 and the pedestrian 110. The object detection module 304 may detect a location of an object and may also determine a category of the object.

The object detection module 304 may use a variety of techniques to determine the location and category of an object. For example, the object detection module 304 may utilize computer vision techniques, image processing techniques, machine learning, or other techniques to detect objects and object locations. In some examples, the object detection module 304 may determine a confidence level indicating how likely the object detection is to be correct. In embodiments, the confidence level may be based on the amount of sensor data received about an object, the performance capabilities of the vehicle sensors 210, an output of a machine learning or other model used to detect an object, as well as other factors.

In addition to determining a location of an object, the object detection module 304 may also categorize the object based on the sensor data received by the sensor data reception module 302. In some examples, the data storage component 214 may include a list of categories into which objects may be categorized and the object detection module 304 may identify one of these predetermined categories for each object detected. In some examples, the list of available categories may be received from the map server 102. In some examples, the object detection module 304 may use a machine learning classifier to categorize detected objects. In other examples, other techniques may be used by the object detection module 304 to categorize detected objects.

In some examples, the object detection module 304 may also detect an identifier associated with a detected object (e.g., a license plate number, a sign board number, or an image of a person's face) that may be used to improve the identification precision between objects detected by the object detection module 304 and objects included in the dynamic map maintained by the map server 102.

The time-to-live association module 306 may associate a time-to-live with an object detected by the object detection module 304. In embodiments, the data storage component 214 may store a table or other data structure indicating a time-to-live associated with each category into which the object detection module 304 may categorize a detected object. In some examples, this time-to-live information may be received from the map server 102.

In some examples, by associating a TTL with a detected object, the vehicle system 200 may compare the TTL of the object (e.g., the initial TTL of the object) to a remaining TTL of the object received from the map server 102, as explained in further detail below. However, in some examples, the map server 102 may transmit the initial TTL and the remaining TTL of an object to the vehicle system 200. In other examples, the map server 102 may simply transmit an initial TTL and a timestamp indicating when the object was added to the dynamic map. The vehicle system 200 may then determine the remaining TTL for this object based on this received information. In these examples, the time-to-live association module 306 may not be included in the one or more memory modules 206.

The object validation module 308 may validate an object by determining whether the object is included in the dynamic map received from the map server 102 and, if so, whether the TTL of the object is close to expiring. As explained above, if the dynamic map maintained by the map server 102 already includes the detected object and the detected object has a TTL that is not close to expiring, there is no need for the vehicle system 200 to indicate the detected object to the map server 102. However, if the dynamic map maintained by the map server 102 does not include the detected object, then the vehicle system 200 may indicate the detected object to the map server 102 so that the map server 102 may add the detected object to the dynamic map. In addition, if the dynamic map maintained by the map server 102 includes the detected object but the TTL is close to expiring, the vehicle system 200 may transmit data about the detected object to the map server 102 so that the map server 102 may reset the TTL of the detected object, thereby preventing the object from being removed from the dynamic map. Accordingly, the object validation module 308 may make the appropriate determinations with respect to the dynamic map and the detected object, as disclosed herein.

When the object detection module 304 detects an object, the object validation module 308 may first determine whether the dynamic map received by the dynamic map reception module 300 from the map server 102 includes the detected object. In particular, the object validation module 308 may determine whether the location of the detected object and the category of the detected object, as determined by the object detection module 304, matches a location and category of an object included in the dynamic map. For example, the object validation module 308 may determine whether any objects on the dynamic map that have the same category as the detected object have a location as indicated by the dynamic map within a threshold distance of the object location determined by the object detection module 304.

In one example, the object validation module 308 may determine whether any dynamic map objects match the category of the detected object and have a location within 30 cm of the object location determined by the object detection module 304. Considering a range (e.g., 30 cm) around the location of the object as specified by the dynamic map may allow for measurement error and uncertainty. The range of 30 cm disclosed herein is merely exemplary and in other examples, other ranges may be used by the object validation module 308 when comparing object locations specified by the dynamic map and object locations determined by the object detection module 304.

If the object validation module 308 determines that an object detected by the object detection module 304 has the same category and the same location (within a threshold distance) as an object on the dynamic map, then it may be concluded that they are the same object and, as such, that the map server 102 is already aware of the detected object. Alternatively, if the object validation module 308 determines that an object detected by the object detection module 304 does not match any objects on the dynamic map (based on object category and object location), then it may be determined that the map server 102 is unaware of the detected object. In this case, the object data transmission module 310 may transmit data about the detected object to the map server 102, as explained in further detail below.

If the object validation module 308 determines that an object detected by the object detection module 304 matches an object on the dynamic map (based on object category and object location), then the object validation module 308 may determine whether the TTL of the object on the dynamic map is close to expiration. For example, the object validation module 308 may determine whether the remaining TTL of the object on the dynamic map is less than 10% of the initial TTL of the object. However, it should be understood that 10% is merely an example and in other examples, the object validation may determine whether the remaining TTL of the object on the dynamic map is less than some other threshold amount (e.g., a percentage of the initial TTL or a specific amount of time).

As discussed above, in some examples, the dynamic map received by the dynamic map reception module 300 may include an initial TTL and a timestamp indicating when each object was added to the dynamic map. In these examples, the object validation module 308 may determine a remaining TTL for the object based on the initial TTL, the timestamp, and a current time. In other examples, the dynamic map received by the dynamic map reception module 300 may include an initial TTL and a remaining TTL for each object. In other examples, the dynamic map received by the dynamic map reception module 300 may only include a remaining TTL for each object and the object validation module 308 may determine an initial TTL for objects based on the output of the time-to-live association module 306.

If the object validation module 308 determines that the remaining TTL on the dynamic map for the detected object is less than a threshold amount, then the object data transmission module 310 may transmit data about the detected object to the map server 102, as explained in further detail below. However, if the object validation module 308 determines that the remaining TTL on the dynamic map for the detected object is not less than the threshold amount, then the object data transmission module 310 may not transmit data about the detected object to the map server 102.

The object data transmission module 310 may cause the network interface hardware 212 to transmit data about an object detected by the object detection module 304 to the map server 102. In embodiments, the object data transmission module 310 may cause the network interface hardware 212 to transmit, to the map server 102, the location of the object and the category of the object as determined by the object detection module 304. In some examples, the object data transmission module 310 may also cause the network interface hardware 212 to transmit a confidence level associated with the detected object to the map server 102. In some examples, the object data transmission module 310 may also cause the network interface hardware 212 to transmit an identifier associated with the detected object as determined by the object detection module 304.

Figure 4:
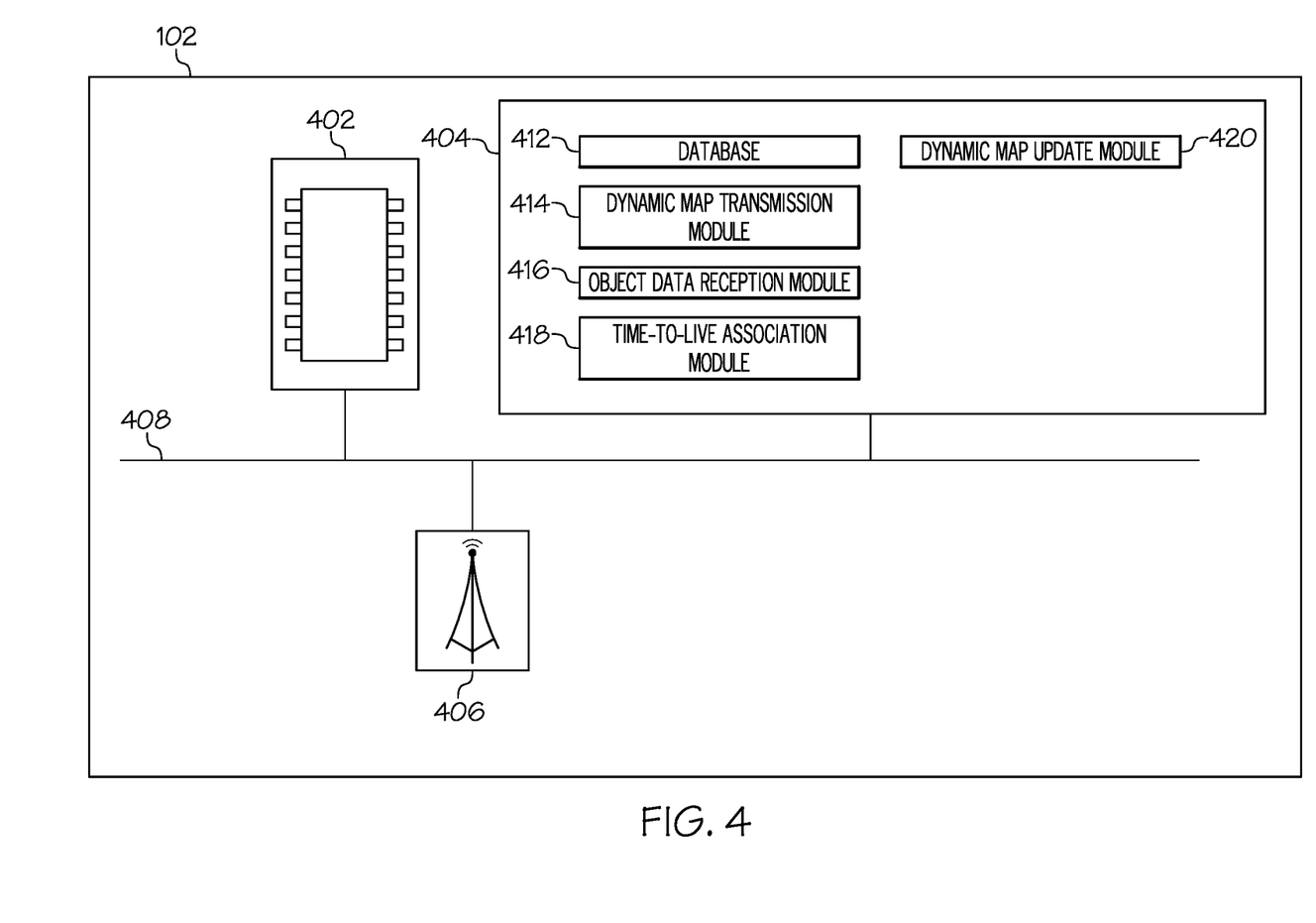
FIG. 4 depicts a schematic diagram of the map server of FIG. 1, according to one or more embodiments shown and described herein.

Now referring to FIG. 4, the map server 102 comprises one or more processors 402, one or more memory modules 404, network interface hardware 406, and a communication path 408. The one or more processors 402 may be a controller, an integrated circuit, a microchip, a computer, or any other computing device. The one or more memory modules 404 may comprise RAM, ROM, flash memories, hard drives, or any device capable of storing machine readable and executable instructions such that the machine readable and executable instructions can be accessed by the one or more processors 402.

The network interface hardware 406 can be communicatively coupled to the communication path 408 and can be any device capable of transmitting and/or receiving data via a network. Accordingly, the network interface hardware 406 can include a communication transceiver for sending and/or receiving any wired or wireless communication. For example, the network interface hardware 406 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 406 includes hardware configured to operate in accordance with the Bluetooth® wireless communication protocol. In some examples, the network interface hardware 406 may include two different channels including a Dedicated Short-Range Communication (DSRC) channel and a millimeter wave radio channel, as discussed in further detail below. The network interface hardware 406 of the map server 102 may transmit and receive data to and from vehicles (e.g., the vehicle 104 of FIG. 1).

The one or more memory modules 404 include a database 412, a dynamic map transmission module 414, an object data reception module 416, a time-to-live association module 418, and a dynamic map update module 420. Each of the database 412, the dynamic map transmission module 414, the object data reception module 416, the time-to-live association module 418, and the dynamic map update module 420 may be a program module in the form of operating systems, application program modules, and other program modules stored in the one or more memory modules 404. In some embodiments, the program module may be stored in a remote storage device that may communicate with the map server 102. In some embodiments, one or more of the database 412, the dynamic map transmission module 414, the object data reception module 416, the time-to-live association module 418, and the dynamic map update module 420 may be stored in the one or more memory modules 206 of the vehicle system 200 of a vehicle. Such a program module may include, but is not limited to, routines, subroutines, programs, objects, components, data structures and the like for performing specific tasks or executing specific data types as will be described below.

The database 412 may store data associated with the dynamic map maintained by the map server 102. This data may include locations and categories of objects within the geographic area covered by the map server 102. This data may also include a TTL associated with each object on the dynamic map.

The database 412 may also temporarily store object data received from vehicles (e.g., the vehicle 104 of FIG. 1). The database 412 may also store other data that may be used by the one or more memory modules 404 and/or other components of the map server 102.

The dynamic map transmission module 414 may cause the network interface hardware 406 to transmit data associated with the dynamic map maintained by the map server 102 to vehicles within the geographic area covered by the map server 102. In some examples, the dynamic map transmission module 414 may cause the network interface hardware 406 to automatically transmit dynamic map data to a vehicle as soon as the vehicle enters the geographic area covered by the map server 102. In other examples, the dynamic map transmission module 414 may cause the network interface hardware 406 to transmit dynamic map data to a vehicle in response to a vehicle request for the dynamic map. In some examples, whenever the dynamic map maintained by the map server 102 is updated, as explained in further detail below, the dynamic map transmission module 414 may cause the network interface hardware 406 to transmit data associated with the updated portion of the dynamic to vehicles within the geographic area covered by the map server 102. This may allow vehicles within the appropriate geographic area to always have the most update dynamic map data.

The object data reception module 416 may receive data about objects detected by connected vehicles (e.g., the vehicle 104 of FIG. 1). As explained above, the object data received by the object data reception module 416 may include a location and a category of an object detected by a connected vehicle. In some examples, the object data received by the object data reception module 416 may also include a confidence level determined by a connected vehicle and/or an identifier associated with a detected object. The object data received by the object data reception module 416 may be used to update the dynamic map maintained by the map server 102, as explained in further detail below.

The time-to-live association module 418 may associate a TTL with an object based on the object data received by the object data reception module 416. In particular, the time-to-live association module 418 may associate a TTL with an object based on the category of the object. In embodiments, the database 412 may include a table or other data structure that associates each of a plurality of categories with a predetermined TTL. The TTL of a particular category may be based on how long the type of object is likely to remain at a particular location. For example, a sign may have a TTL of 1 day, a road obstacle may have a TTL of 15 minutes, and a pedestrian or animal may have a TTL of 5 seconds.

The dynamic map update module 420 may update the dynamic map based on object data received by the object data reception module 416. In particular, the dynamic map update module 420 may update object data stored in the database 412 based on object data received by the object data reception module 416.

If the object data reception module 416 receives data about an object that is not already included in the dynamic map maintained by the map server 102, then the dynamic map update module 420 may add the object data to the dynamic map. In particular, the dynamic map update module 420 may add the location of an object received by the object data reception module 416 and the category of the object to the dynamic map. The dynamic map update module 420 may also add the TTL of the object as determined by the time-to-live association module 418.

If the object data reception module 416 receives data about an object that is already included in the dynamic map maintained by the map server 102, then the dynamic map update module 420 may reset the TTL of the object. This indicates that the detected object is still present at its previously detected location, and will not be removed from the dynamic map at least until the new TTL expires.

In some examples, the dynamic map update module 420 may qualify object data received by the object data reception module 416 based on freshness, confidence, precision of location and comparison with current objects on the dynamic map. For instance, in some examples, the dynamic map update module 420 may only add a new object to the dynamic map or reset the TTL of an object if the confidence level associated with the detected object is above a predetermined threshold amount.

In addition to updating the dynamic map based on object data received by the object data reception module 416, the dynamic map update module 420 may also periodically determine whether any objects have an expired TTL and should be removed from the map. For example, the dynamic map update module 420 may periodically (e.g., every 5 seconds) check the TTL of every object included in the dynamic map. The dynamic map update module 420 may determine whether the TTL of any objects included in the dynamic map have expired. If the TTL of an object included in the dynamic map has expired, then the dynamic map update module 420 may remove the object data from the dynamic map.

Figure 5:
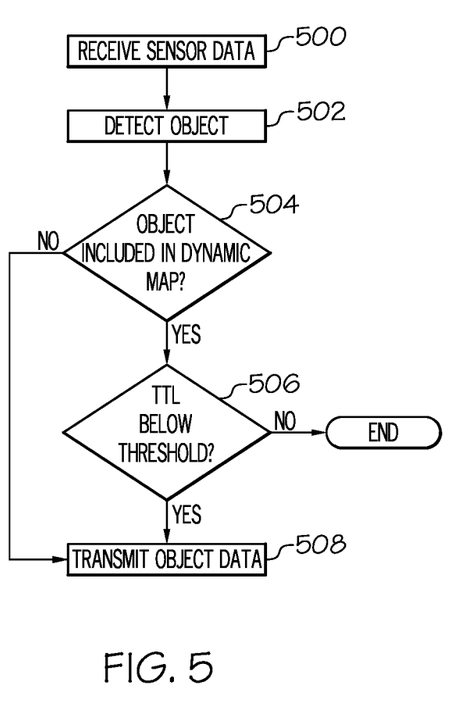
FIG. 5 depicts a flowchart of a method of operating the vehicle system of FIGS. 2-3, according to one or more embodiments shown and described herein.

FIG. 5 depicts a flowchart of an example method for operating the vehicle system 200 of FIGS. 2-3. At step 500, the sensor data reception module 302 receives sensor data captured by the vehicle sensors 210 of the vehicle system 200. At step 502, the object detection module 304 detects an object based on the sensor data received by the sensor data reception module 302. The object detection module 304 may determine a location of the object and a category of the object based on the sensor data received by the sensor data reception module 302.

At step 504, the object validation module 308 determines whether the detected object is included in the dynamic map maintained by the map server 102 and received by the dynamic map reception module 300. In particular, the object validation module 308 determines whether any objects included in the dynamic map have the same category as the detected object and have a location on the dynamic map within a threshold distance of the location detected by the object detection module 304. If the object validation module 308 determines that the object is included in the dynamic map (yes at step 504), then control passes to step 506. If the object validation module 308 determines that the object is not included in the dynamic map (no at step 504), then control passes to step 508.

At step 506, after the object validation module 308 determines that the object detected by the object detection module 304 is included in the dynamic map, the object validation module 308 determines whether the TTL associated with the detected object in the dynamic map is less than a threshold amount. If the object validation module 308 determines that the TTL of the object in the dynamic map is less than the threshold amount (yes at step 506), then control passes to step 508. If the object validation module 308 determines that the TTL of the object in the dynamic map is not less than the threshold amount (no at step 506), then the method of FIG. 5 ends.

At step 508, after the object validation module 308 determines that the detected object is not included in the dynamic map at step 504, or after the object validation module 308 determines that the TTL of the object in the dynamic map is less than the threshold amount, the object data transmission module 310 causes the network interface hardware 212 to transmit data of the detected object to the map server 102. In particular, the object data transmission module 310 causes the network interface hardware 212 to transmit the location of the object and the category of the object as determined by the object detection module 304. In some examples, the object data transmission module 310 also causes the network interface hardware 212 to transmit a confidence level and/or an identifier associated with the detected object to the map server 102.

Figure 6:
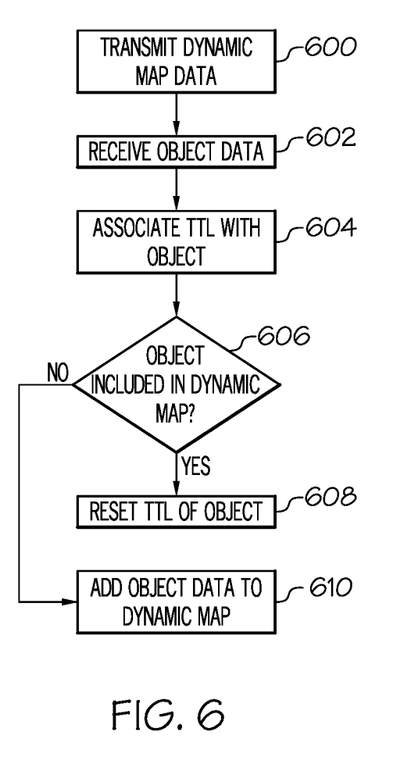
FIG. 6 depicts a flowchart of a method of operating the map server of FIGS. 1 and 4, according to one or more embodiments shown and described herein.

FIG. 6 depicts a flowchart of an example method for operating the map server 102 of FIGS. 1 and 4. At step 600, the dynamic map transmission module 414 causes the network interface hardware 406 to transmit data of the dynamic map maintained by the map server 102 to a connected vehicle within the geographic area covered by the map server 102. In some examples, the dynamic map transmission module 414 causes the network interface hardware 406 to automatically transmit the dynamic map data to a connected vehicle when the vehicle enters the geographic area covered by the map server 102. In other examples, the dynamic map transmission module 414 causes the network interface hardware 406 to transmit the dynamic map data to a connected vehicle upon receiving a request from the vehicle for the dynamic map data.

At step 602, the object data reception module 416 receives object data associated with an object detected by a connected vehicle. The object data may include a location and category of the object as determined by the connected vehicle. In some examples, the object data may also include an identifier associated with the object and/or a confidence level associated with the object detection.

At step 604, the time-to-live association module 418 associates a TTL with the received object based on the category of the object. At step 606, the dynamic map update module 420 determines whether the received object is already included in the dynamic map. If the received object is already included in the dynamic map (yes at step 606), then control passes to step 608 and the dynamic map update module 420 resets the TTL of the object. If the received object is not included in the dynamic map (no at step 606), then control passes to step 610 and the dynamic map update module 420 adds the received object data to the dynamic map.

It should now be understood that embodiments described herein are directed to a method and system for optimized notification of detected event on vehicles. A map server may maintain a dynamic map that includes objects detected by connected vehicles. When a connected vehicle enters a geographic area covered by the map server, the map server may transmit the dynamic map to the connected vehicle.

As the connected vehicle drives through the geographic area covered by the map server, the connected vehicle may gather sensor data and may detect objects based on the sensor data. When the vehicle detects an object, it may determine the location of the object based on the sensor data and may categorize the object based on the sensor data. The vehicle may then determine whether the dynamic map includes the detected object by comparing the determined location and category of the object to the dynamic map data.

If the dynamic map does not include the detected object, then the vehicle may transmit the detected object data to the map server and the map server may add the detected object to the dynamic map. If the dynamic map does include the detected object, then the vehicle may determine whether a time-to-live associated with the detected object on the dynamic map is close to expiration. If the time-to-live associated with the object is close to expiration, the vehicle may transmit the object data to the map server. The map server may then reset the time-to-live associated with the object.

Accordingly, the map server may maintain an up-to-date dynamic map based on objects detected by connected vehicles, while minimizing the bandwidth needed for data transmission between the map server and connected vehicles.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   detecting, at a vehicle system of a vehicle, an object based on sensor data received from one or more sensors;
   determining whether a dynamic map maintained by a remote computing device includes the detected object;
   upon determination that the dynamic map includes the detected object, determining a remaining time-to-live associated with the detected object based on the dynamic map; and
   transmitting data about the detected object to the remote computing device if the determined remaining time-to-live associated with the detected object is less than a predetermined threshold time.

2. The method of claim 1, further comprising:
   determining a location of the object based on the sensor data;
   determining a category of the object based on the sensor data; and
   determining whether the dynamic map maintained by the remote computing device includes the detected object based on the location of the determined the object, the determined category of the object, and data associated with the dynamic map.

3. The method of claim 2, further comprising:
   determining a time-to-live associated with the object based on the determined category of the object; and
   determining the threshold time based on the determined time-to-live associated with the object.

4. The method of claim 3, wherein the determined threshold time is a predetermined percentage of the determined time-to-live.

5. The method of claim 1, further comprising:
   downloading, from the remote computing device, data associated with the dynamic map when the vehicle enters a geographic area associated with the remote computing device.

6. The method of claim 5, wherein the data associated with the dynamic map that is downloaded only includes data associated with objects included in the dynamic map that can be detected by the vehicle system.

7. The method of claim 1, wherein the dynamic map includes locations and categories of one or more objects.

8. The method of claim 1, further comprising:
   upon determination that the dynamic map does not include the detected object, transmitting the data about the detected object to the remote computing device.

9. A vehicle system for a vehicle comprising:
   one or more sensors configured to gather sensor data; and
   a processor configured to:
      detect an object based on the sensor data received from the one or more sensors;
      determine whether a dynamic map maintained by a remote computing device includes the detected object;
      upon determination that the dynamic map includes the detected object, determine a remaining time-to-live associated with the detected object based on the dynamic map; and
      transmit data about the detected object to the remote computing device if the determined remaining time-to-live associated with the detected object is less than a predetermined threshold time.

10. The vehicle system of claim 9, wherein the processor is further configured to:
    determine a location of the object based on the sensor data;
    determine a category of the object based on the sensor data; and
    determine whether the dynamic map maintained by the remote computing device includes the detected object based on the location of the determined the object, the determined category of the object, and data associated with the dynamic map.

11. The vehicle system of claim 10, wherein the processor is further configured to:
    determine a time-to-live associated with the object based on the determined category of the object; and
    determine the threshold time based on the determined time-to-live associated with the object.

12. The vehicle system of claim 11, wherein the determined threshold time is a predetermined percentage of the determined time-to-live.

13. The vehicle system of claim 9, wherein the processor is further configured to:
    download, from the remote computing device, data associated with the dynamic map when the vehicle enters a geographic area associated with the remote computing device.

14. The vehicle system of claim 13, wherein the data associated with the dynamic map that is downloaded only includes data associated with objects included in the dynamic map that can be detected by the vehicle system.

15. The vehicle system of claim 9, wherein the dynamic map includes locations and categories of one or more objects.

16. The vehicle system of claim 9, wherein the processor is further configured to:
   upon determination that the dynamic map does not include the detected object, transmit the data about the detected object to the remote computing device.

17. A system comprising:
   a vehicle system of a vehicle to collect sensor data from one or more vehicle sensors; and
   a remote computing device to maintain a dynamic map of road objects,
   wherein the vehicle system is configured to:
      receive the dynamic map from the remote computing device;
      detect an object based on the sensor data;
      determine whether the dynamic map includes the detected object;
      upon determination that the dynamic map includes the detected object, determine a remaining time-to-live associated with the detected object based on the dynamic map; and
      transmit data about the detected object to the remote computing device if the determined remaining time-to-live associated with the detected object is less than a predetermined threshold time.

18. The system of claim 17, wherein the vehicle system is configured to:
   upon determination that the dynamic map does not include the detected object, transmit the data about the detected object to the remote computing device.

19. The system of claim 18, wherein the remote computing device is configured to:
   receive the data about the detected object; and
   update the dynamic map based on the received data about the detected object.

20. The system of claim 19, wherein the remote computing device is further configured to:
   determine whether the dynamic map includes data about the detected object;
   upon determination that the dynamic map does not include data about the detected object, add the data about the detected object to the dynamic map; and
   upon determination that the dynamic map does include data about the detected object, reset a time-to-live associated with the detected object.

* * * * *

UNITED STATES PATENT AND TRADEMARK OFFICE
CERTIFICATE OF CORRECTION

| | | |
|---|---|---|
| PATENT NO. | : 11,796,345 B2 | |
| APPLICATION NO. | : 17/401665 | |
| DATED | : October 24, 2023 | |
| INVENTOR(S) | : Masashi Nakagawa | |

It is certified that error appears in the above-identified patent and that said Letters Patent is hereby corrected as shown below:

In the Specification

In Column 12, Line(s) 35, delete "update" and insert --updated--, therefor.

Signed and Sealed this
Twelfth Day of December, 2023

Katherine Kelly Vidal
*Director of the United States Patent and Trademark Office*